US011976687B2

(12) United States Patent
Sasidharan et al.

(10) Patent No.: US 11,976,687 B2
(45) Date of Patent: May 7, 2024

(54) BEARING ASSEMBLY FOR TRACKER ASSEMBLY AND METHODS OF MAKING AND USING THE SAME

(71) Applicant: SAINT-GOBAIN PERFORMANCE PLASTICS CORPORATION, Solon, OH (US)

(72) Inventors: Akhilesan Sasidharan, Chennai (IN); Nirmal Bharatwaj, Chennai (IN); Vivek Vipparthi, Chennai (IN); Maruti Naik, Chennai (IN); Kartik Kumar, Chennai (IN)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 17/659,367

(22) Filed: Apr. 15, 2022

(65) Prior Publication Data
US 2022/0333642 A1    Oct. 20, 2022

(30) Foreign Application Priority Data

Apr. 16, 2021    (IN) .............................. 202141017660

(51) Int. Cl.
*H02S 20/10* (2014.01)
*F16C 23/04* (2006.01)
(Continued)

(52) U.S. Cl.
CPC .............. *F16C 23/04* (2013.01); *F24S 25/12* (2018.05); *F24S 30/425* (2018.05); *H02S 20/10* (2014.12);
(Continued)

(58) Field of Classification Search
CPC ..... F24S 30/425; F24S 2030/15; Y02E 10/47; Y02E 10/50; H02S 20/32; H02S 20/10
See application file for complete search history.

(56) References Cited

U.S. PATENT DOCUMENTS

| 5,108,168 A | 4/1992 | Norbert et al. |
| 6,095,690 A | 8/2000 | Niegel et al. |
| (Continued) | | |

FOREIGN PATENT DOCUMENTS

| CN | 101963190 A | 2/2011 |
| CN | 102985765 A | 3/2013 |
| (Continued) | | |

OTHER PUBLICATIONS

Indian Provisional Patent Application No. 201841048811, filed Dec. 22, 2018, 23 pages.
(Continued)

*Primary Examiner* — Basil S Katcheves
*Assistant Examiner* — Daniel J Kenny
(74) *Attorney, Agent, or Firm* — Abel Schillinger, LLP; Ann Palma (57) ABSTRACT

A bearing assembly of a power generation structure including, a rail; and a housing adapted to support the rail; where the housing includes a fixed housing portion attached to a support beam, and an adjustable housing portion attached to rail, where a low friction material is present at an interface between an exterior surface of rail and an interior surface of the adjustable housing portion, where the adjustable housing portion is capable of self-aligning adjustment of at least a portion of the rail out of alignment with a central axis of the support beam.

20 Claims, 5 Drawing Sheets

(51) Int. Cl.
  *F24S 25/12* (2018.01)
  *F24S 30/425* (2018.01)
  *H02S 20/32* (2014.01)
  *F24S 30/00* (2018.01)

(52) U.S. Cl.
  CPC .......... *H02S 20/32* (2014.12); *F16C 2380/00* (2013.01); *F24S 2030/14* (2018.05); *F24S 2030/15* (2018.05)

(56) References Cited

U.S. PATENT DOCUMENTS

| | | | |
|---|---|---|---|
| 8,273,978 | B2 | 9/2012 | Thompson et al. |
| 8,807,839 | B2 | 8/2014 | Jang |
| 8,905,016 | B2 | 12/2014 | Sakai et al. |
| 8,984,817 | B2 | 3/2015 | Weiden et al. |
| 9,022,019 | B2 | 5/2015 | Jeronimo Lopes |
| 9,022,656 | B2 | 5/2015 | Burgeff et al. |
| 9,206,999 | B2 | 12/2015 | Reed et al. |
| 9,322,437 | B2 | 4/2016 | Agullo |
| 9,455,664 | B2 | 9/2016 | Barton |
| 9,819,301 | B2 | 11/2017 | Ripoll Agullo |
| 10,254,011 | B2 | 4/2019 | Hockaday |
| 10,320,326 | B2 | 6/2019 | Schimelpfenig et al. |
| 10,972,045 | B2 * | 4/2021 | Cherukupalli .......... F24S 50/20 |
| 2010/0180884 | A1 | 7/2010 | Oosting |
| 2011/0049834 | A1 | 3/2011 | Natu |
| 2011/0114080 | A1 | 5/2011 | Childers et al. |
| 2011/0250040 | A1 * | 10/2011 | Hofstra ................. B60P 1/6454 254/133 R |
| 2012/0219243 | A1 | 8/2012 | Jang |
| 2012/0240350 | A1 | 9/2012 | Natu et al. |
| 2013/0039610 | A1 | 2/2013 | Schneider et al. |
| 2014/0026940 | A1 | 1/2014 | Alonso Salmeron et al. |
| 2014/0140755 | A1 | 5/2014 | Clavijo Lumbreras |
| 2015/0059826 | A1 | 3/2015 | Reed et al. |
| 2015/0076314 | A1 | 3/2015 | Holze |
| 2015/0158586 | A1 | 6/2015 | Hachtmann et al. |
| 2015/0229267 | A1 | 8/2015 | Hilliard |
| 2016/0069112 | A1 | 3/2016 | Neumark et al. |
| 2016/0123383 | A1 | 5/2016 | Lamb et al. |
| 2017/0102168 | A1 | 4/2017 | Childress |
| 2017/0229998 | A1 | 8/2017 | Molina et al. |
| 2017/0234580 | A1 | 8/2017 | Worden |
| 2018/0038415 | A1 | 2/2018 | Muehling et al. |
| 2018/0062565 | A1 | 3/2018 | Schimelpfenig et al. |
| 2018/0254740 | A1 | 9/2018 | Corio |
| 2018/0347859 | A1 | 12/2018 | Ros Ruiz et al. |
| 2019/0292823 | A1 | 9/2019 | Dally |
| 2019/0372512 | A1 | 12/2019 | Betts et al. |
| 2022/0057113 | A1 | 2/2022 | Sasidharan et al. |
| 2022/0357077 | A1 * | 11/2022 | Achaerandio Fernández .............. F16C 17/02 |

FOREIGN PATENT DOCUMENTS

| | | |
|---|---|---|
| CN | 203655912 U | 6/2014 |
| CN | 204533163 U | 8/2015 |
| CN | 105009446 A | 10/2015 |
| CN | 105910474 A | 8/2016 |
| CN | 106911298 A | 6/2017 |
| CN | 206429546 U | 8/2017 |
| CN | 107588100 A | 1/2018 |
| CN | 107795576 A | 3/2018 |
| JP | 200027854 A | 1/2000 |
| JP | 2009510789 A | 3/2009 |
| JP | 2013503306 A | 1/2013 |
| JP | 2013515221 A | 5/2013 |
| KR | 20100120985 A | 11/2010 |
| KR | 20120102772 A | 9/2012 |
| KR | 101538465 B1 | 7/2015 |
| WO | 2013101696 A2 | 7/2013 |
| WO | 2017162565 A1 | 9/2017 |
| WO | 2020129091 A1 | 6/2020 |

OTHER PUBLICATIONS

Indian Complete Patent Application No. 201841048811, filed Dec. 22, 2019, 36 pages.
International Search Report and Written Opinion for PCT/IN2019/050947, dated May 18, 2020, 9 pages.
International Search Report and Written Opinion for PCT/US2022/071734, dated Aug. 3, 2022, 10 pages.
International Search Report and Written Opinion for PCT/EP2022/081322, dated Feb. 10, 2023, 17 pages.
E. Lacasa et al., Implementing Sustainability Criteria in Product Development, Procedia Engineering 132, pp. 1029-1036, Dec. 2015.

* cited by examiner

BEARING ASSEMBLY FOR TRACKER ASSEMBLY AND METHODS OF MAKING AND USING THE SAME

CROSS-REFERENCE TO RELATED APPLICATION(S)

This application claims priority to and the benefit of Indian Patent Application No. 202141017660, entitled "BEARING ASSEMBLY FOR TRACKER ASSEMBLY AND METHODS OF MAKING AND USING THE SAME," by Akhilesan SASIDHARAN et al., filed Apr. 16, 2021, which is assigned to the current assignee hereof and incorporated herein by reference in its entirety.

FIELD OF DISCLOSURE

The following disclosure relates to bearing assemblies for tracker assemblies with exemplary uses in renewable energy structures.

BACKGROUND

Tracking assemblies are typically used in radar, light shelf, antennas, solar panels, automobiles and other applications which require continuous rotary motion. One common example of tracker assembly used in the industry is solar trackers for use with renewable energy source assemblies. Solar trackers conventionally include a mounting means to mount solar panels. The mounting means of the solar tracker is designed to change its orientation of the solar panels so as to reflect the sun's position to maximize efficiency. Further, ground preparation to accommodate for surface undulations for mounting tracking assemblies remains a diligent and costly step in maximizing solar panel efficiency. Therefore, as the industries surrounding renewable energy sources and tracker assemblies continue to mature, improvements in the components responsible for ensuring power generation will be demanded to improve efficiency, provide lower maintenance, increase deployment potential, and lower the cost of installation.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and bearing assembly arts.

Figure 1A:
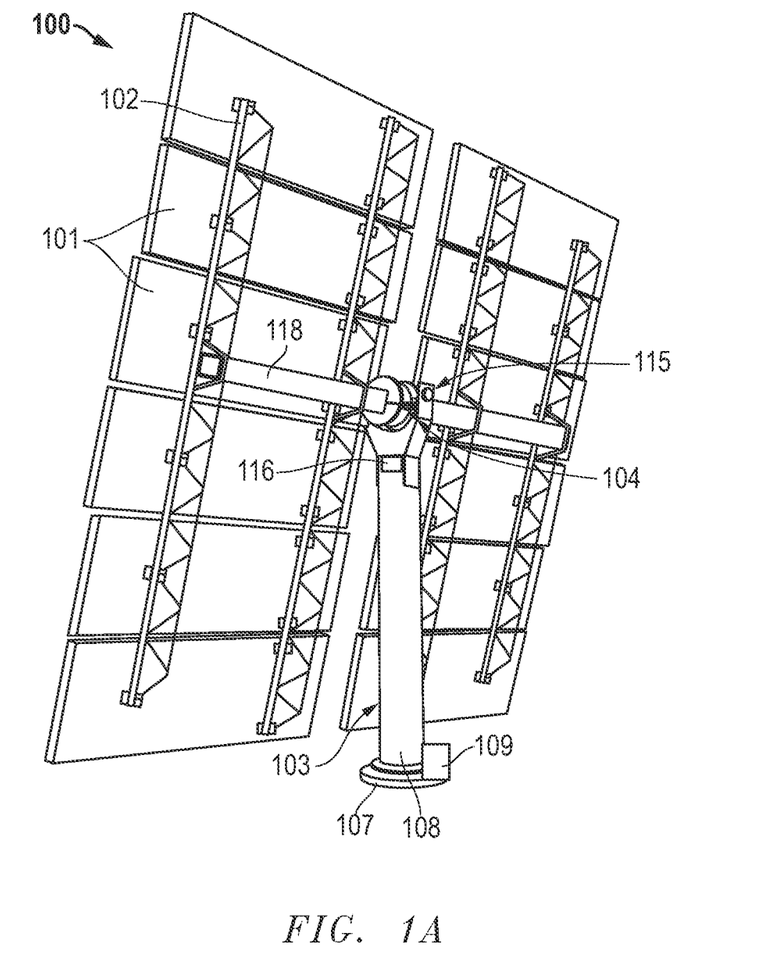
FIG. 1A includes an illustration of a side view of a power generation structure that includes a tracking assembly in accordance with an embodiment.

FIG. 1A includes an illustration of a side view of a power generation structure that includes a tracking assembly in accordance with an embodiment. In particular, the tracking assembly 100 may be particularly suitable for utilizing solar power, and converting solar energy to electrical energy. As illustrated, the tracking assembly 100 can include a base 103, including a foundation 107, which may be directly attached to the ground for securing the structure 100 in its location. As further illustrated, the base 103 can include a support beam 108 directly connected to the foundation 107 and extending upward from the foundation 107 for support and connection of other components of the structure 100. As further illustrated, the base 103 can include a power terminal 109 attached to the foundation 107, which may supply energy to motors used to move portions of the structure 100. The ability to adjust the height of the tracking assembly 104 via the power terminal 109 extending the support beam 108 is also contemplated herein.

The power generation structure 100 can further include tracker assembly 104 including a bearing assembly 115 attached to the base 103, and in particular, directly attached to the support beam 108, and configured to move a rail 118 operably connected to the bearing assembly 115. The bearing assembly 115 as described herein may refer to a movable interface between at least two components, where one of the components is designed to move relative to the other component. Types of movement can include simple translation (along one axis), compound translation (along two or more axes), simple rotation (around one axis) compound rotation (around two or more axes), and a combination thereof. The tracker assembly 104 can further include a drive mechanism 116 that may include a motor, which aids movement of the bearing assembly 115 and the rail 118. In particular, the drive mechanism 116 can be programmed such that it changes the position of the rail 118, and thus, the position of photovoltaic (solar) panels 101 that may be attached to the rail 118, such that the panels 101 can follow the position of the sun in the sky for efficient collection and/or direction of radiant beams of energy from the sun. As will be appreciated, movement of the rail 118 can facilitate movement of portions of the structure 100, and in particular, panels 101 that are attached to the rail 118 via support structures 102. For example, the rail 118 may be adapted to rotatably support the panels 101 about a rotational axis. As illustrated, the structure 100 can include an array of panels 101 attached to a single base 103. According to one embodiment, the panels 101 can be energy conversion structures, such as solar panels, configured to convert radiant energy of the sun into electrical power. In another embodiment, the panels 101 of the article can be reflectors, such as mirrors, designed to re-direct the radiant energy of the sun to nearby energy conversion structures, such as solar panels.

While not illustrated, the structure 100 can include other bearing assemblies, such as between the foundation 107 and the support beam 108 for rotation of the support beam 108 relative to the foundation 107. Moreover, it will be appreciated that other energy conversion structures can utilize a bearing assembly 115, and particularly components disclosed herein within the bearing assembly 115. For example, another suitable energy conversion structure can include a wind turbine, which may include a plurality of propellers (or vanes) extending from a central structure, wherein the turbines must be allowed to rotate for the generation of electrical power, and thus, may utilize components disclosed herein at a bearing assembly within the structure.

Figure 1B:
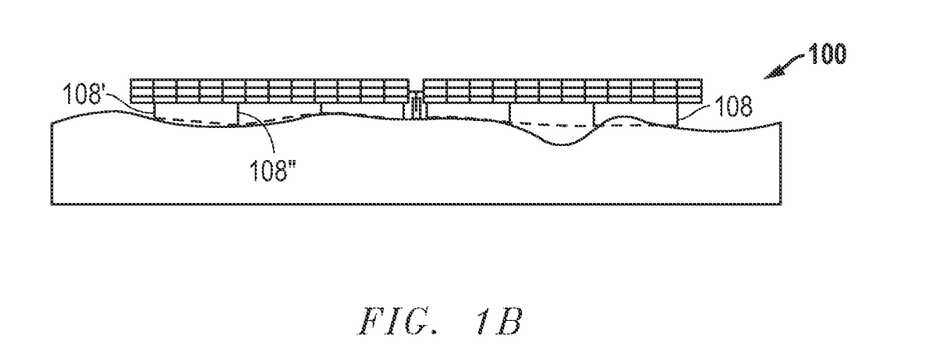
FIG. 1B includes an illustration of a front view of a power generation structure that includes a tracking assembly in accordance with an embodiment.

FIG. 1B includes an illustration of a front view of a power generation structure that includes a tracking assembly in accordance with an embodiment. As shown in FIG. 1B, the power generation structure 100 may include multiple support beams 108, 108', 108" to support the power generation structure 100. Each support beam 108, 108', 108" may be anchored, fixed, or otherwise supported by the ground terrain upon which the power generation structure 100 is positioned. As shown in FIG. 1B, in some embodiments, the ground terrain may be undulated, causing the support beams 108, 108', 108" to require further adjustment to have the rail adjust to move the tracker assembly 104, as described in further detail below.

Figure 2A:
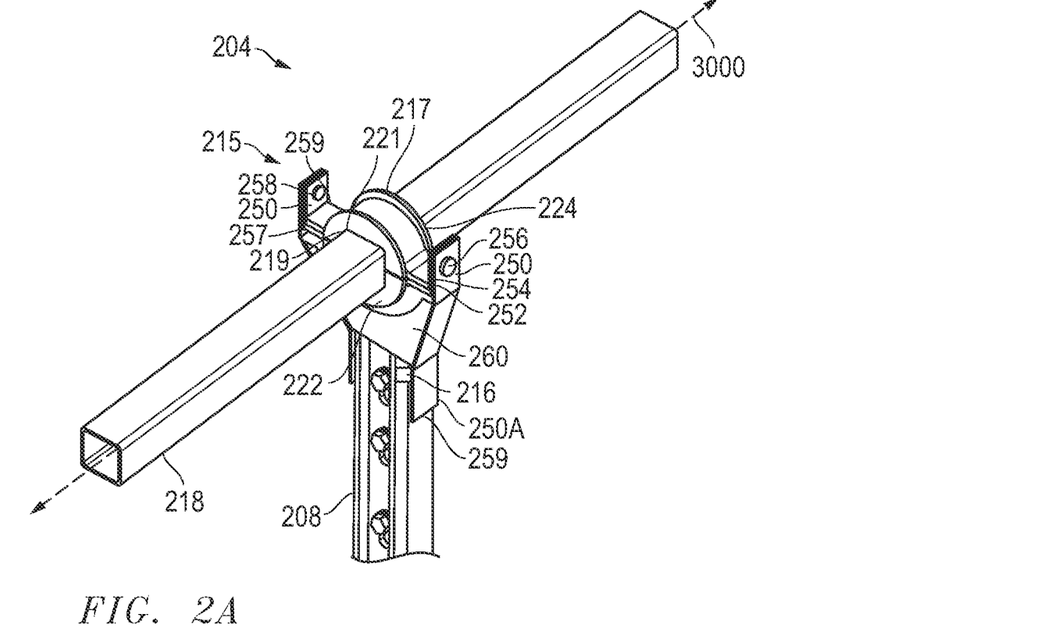
FIG. 2A includes an illustration of a side view of a bearing assembly for the tracking assembly in accordance with an embodiment.

FIG. 2A includes an illustration of a side view of a bearing assembly for the tracking assembly in accordance with an embodiment. The bearing assembly 215 of the tracking assembly 204 may be placed on the support beam 208 and operated operably connected to the drive mechanism 216. The bearing assembly 215 of the tracking assembly 204 can include an adaptor 217 configured to support the rail 218 directed down a rotational axis 3000. The adaptor 217 may include a first adaptor member 222 and a second adaptor member 224 that at least partially surround a portion of the rail 218 as described in further detail below. As shown in FIG. 2A, an exterior surface 219 of the rail 218 may have a non-circular cross-section when viewed in cross-section perpendicular to the rotational axis 3000. In some embodiments, the exterior surface 219 of the rail 218 may have a polygonal cross-section when viewed in cross-section perpendicular to the rotational axis 3000. As shown, the exterior surface 219 of the rail 218 may have a square cross-section but triangular, pentagonal, hexagonal, or other polygonal cross-sections are contemplated herein. Further, in some embodiments, the exterior surface 219 of the rail 218 may have an oval, semi-circular, or other cross-section that is non-circular when viewed in cross-section perpendicular to the rotational axis 3000. Further as shown in FIG. 2A, an interior surface 221 of the adaptor 217 may have a non-circular cross-section when viewed in cross-section perpendicular to the rotational axis 3000. In some embodiments, the interior surface 221 of the adaptor 217 may have a polygonal cross-section when viewed in cross-section perpendicular to the rotational axis 3000. As shown, the interior surface 221 of the adaptor 217 may have a square cross-section but triangular, pentagonal, hexagonal, or other cross-sections are contemplated herein. Further, the interior surface 221 of the adaptor 217 may have an oval, semi-circular, or other cross-section that is non-circular when viewed in cross-section perpendicular to the rotational axis 3000. The interior surface 221 of the adaptor may be complementary to the exterior surface 219 of the rail 218 so that they are complementary to each other and may generally fix or couple the rail 218 and the adaptor 217 such that they are rotatable as a single paired component about the rotational axis 3000. In other words, the rail 218 and the adaptor 217 may be fixed and rotatable together about a rotational axis 3000 due to their paired surfaces. In some embodiments, the adaptor 217 can further include secondary components (not shown) that may facilitate the movement of the rail 218, including for example bearing members, suitable for facilitating the sliding of the rail 218 axially relative to the adaptor 217.

Figure 2B:
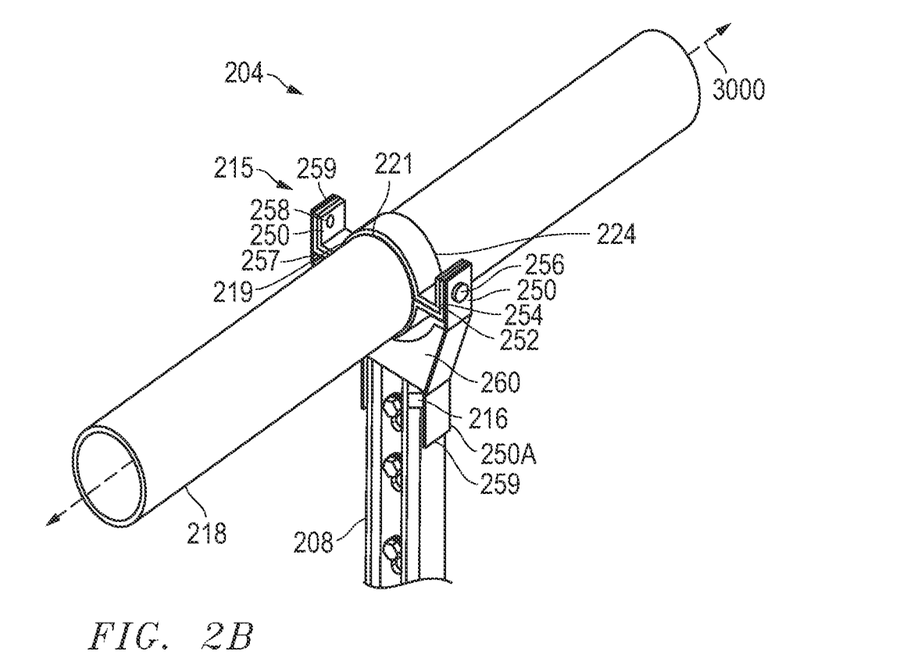
FIG. 2B includes an illustration of a side view of a bearing assembly for the tracking assembly in accordance with an embodiment.

Still referring to FIG. 2A, the bearing assembly 215 of the tracking assembly 204 may further include a housing 250. The housing 250 may be adapted to support the adaptor 217 and the rail 218. FIG. 2B includes an illustration of a side view of a bearing assembly for the tracking assembly in accordance with an embodiment. It is contemplated and incorporated according to embodiments of the tracking assembly and/or bearing assembly herein, as shown in FIG. 2B, that the adaptor 217 may not be included and the rail 218 may be supported by the housing 250 directly. In such cases, the rail 218 may have a circular, oval, semi-circular, or other cross-section that is non-circular when viewed in cross-section perpendicular to the rotational axis 3000 that couples with the shape of the housing 250. In some embodiments, the housing 250 may have a first housing member 252 and a second housing member 254 that may be used to at least partially fasten the rail 218 and the adaptor 217 together such that they may not move apart from each other in a radial direction relative to the rotational axis 3000. The adaptor 217 and/or rail 218 may be configured to rotate relative to the housing 250 around the rotational axis 3000. The first housing member 252 may have an exterior surface 253 and an interior surface 255. The second housing member 254 may have an exterior surface 257 and an interior surface 259. The interior surface 255 of the first housing member 252 and the interior surface 259 second housing member 254 of the housing may be contacting or contiguous with each other via a mechanical interface that couples the two pieces together. This mechanical interface may be fixed with at least one fastener 256 to fix the first housing member 252 and the second housing member 254 together. The fastener 256 may include at least one of nuts, bolts, bearings, battens, buckles, clips, flanges, frogs, grommets, hook-and-eyes, latches, pegs, nails, rivets, tongue-and grooves, screw anchors, snap fasteners, stitches, threaded fasteners, ties, toggle bolts, wedges anchors, or may be attached a different way. In some embodiments, the fastener 256 may include the low friction material described in more detail below. In the embodiment shown, the fastener 256 may include holes 258 in the housing members that align for the insertion of screws 259, whereby tightening the adaptor 217 to the pedestal 208. In this way, the first housing member 252 and the second housing member 254 may function as a clamp around the adaptor 217.

Figure 2C:
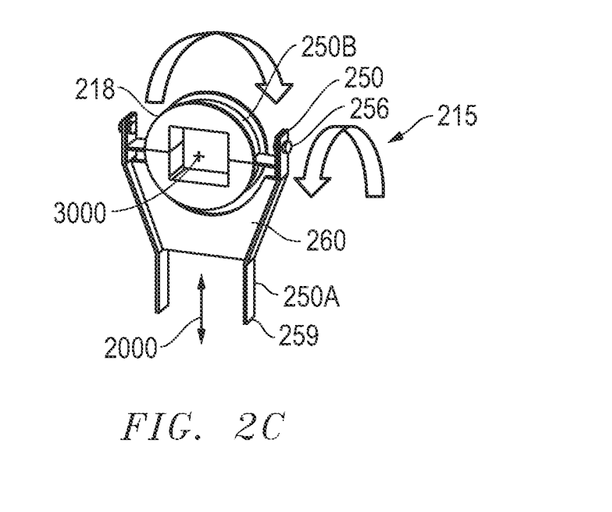
FIG. 2C includes a front perspective view of one embodiment of a bearing assembly in accordance with an embodiment.
Figure 2D:
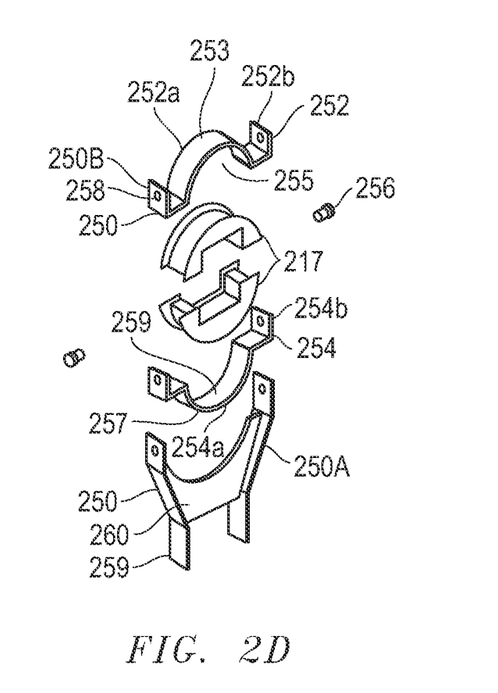
FIG. 2D includes a top cut-away view of one embodiment of a bearing assembly in accordance with an embodiment.
Figure 2E:
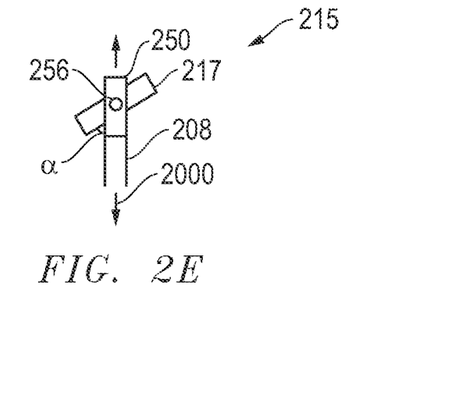
FIG. 2E includes a cross-sectional view of one embodiment of a bearing assembly in accordance with an embodiment.

FIG. 2C includes a front perspective view of one embodiment of a bearing assembly in accordance with an embodiment. FIG. 2D includes a top cut away view of one embodiment of a bearing assembly in accordance with an embodiment. FIG. 2E includes a cross-sectional view of one embodiment of a bearing assembly in accordance with an embodiment. The bearing assembly 215 may include any of the components (and features thereof) listed above in FIG. 2A, including but not limited to, the adapter 217, the housing 250, the rail, the support beam, and/or the (low friction) material strip. Referring to FIGS. 2C-2E, the housing 250 may have a fixed housing portion 250A and an adjustable housing portion 250B. The fixed portion 250A may be anchored, fixed or otherwise attached to the rail in the tracker assembly (not shown) down a central axis 2000. The bearing assembly 215 can include at least one fastener 259 to fix the fixed housing portion 250A and the support beam. The fastener 259 may include at least one of nuts, bolts, bearings, battens, buckles, clips, flanges, frogs, grommets, hook-and-eyes, latches, pegs, nails, rivets, tongue-and grooves, screw anchors, snap fasteners, stitches, threaded fasteners, ties, toggle bolts, wedges anchors, or may be attached a different way. In some embodiments, the fastener 256 may include the low friction material described in more detail below. In the embodiment shown, the support beam may include holes that align for the insertion of fastener 259, whereby tightening the fixed housing portion 250A to the support beam. In a number of embodiments, the fixed housing portion 250A may be integral or uniform with the support beam. In a number of embodiments, the fixed housing portion 250A may include a support hood 260. The support hood 260 may include any cross-sectional shape including polygonal, oval, ellispsis, semi-circular, or circular.

As shown in FIGS. 2C-2E, the adjustable housing portion 250B may have a first housing member 252 and a second housing member 254 that may be used to at least partially fasten the rail (not shown) and the adaptor 217 together such that they may not move apart from each other in a radial direction relative to the rotational axis 3000. The first housing member 252 may have an exterior surface 253 and an interior surface 255. The first housing member 252 may have a semi-circular portion 252a meant to house the bearing/low friction material (not shown) and the adapter 217. The first housing member 252 may have an attachment portion 252b. The second housing member 254 may have an exterior surface 257 and an interior surface 259. The second housing member 254 may have a semi-circular portion 254a meant to house the bearing (not shown) and the adapter 217. The interior surface 255 of the first housing member 252 may include a material strip and/or low friction material fixed to it as described above. The interior surface 259 of the second housing member 254 may include a material strip and/or low friction material fixed to it as described above. Further, as stated above, the exterior surface of the adapter 217 may include a material strip and/or low friction material fixed to it as described above. The second housing member 254 may have an attachment portion 254b. The first housing member 252 and the second housing member 254 of the housing may be contacting or contiguous with each other via a mechanical interface that couples the two pieces together around the adapter 217 (and rail) using their respective semi-circular portions 252a, 254a. As shown in FIGS. 2C-2E, this mechanical interface may include the attachment portions 252b, 254b of the first housing member 252 and second housing member 254 and may be fixed with at least one fastener 256 to fix the first housing member 252 and the second housing member 254 together. The fastener 256 may include at least one of nuts, bolts, battens, buckles, clips, flanges, frogs, grommets, hook-and-eyes, latches, pegs, nails, rivets, tongue-and grooves, screw anchors, snap fasteners, stitches, threaded fasteners, ties, toggle bolts, wedges anchors, or may be attached a different way. In the embodiment shown, the attachment portions 252b, 254b of the first housing member 252 and second housing member 254 may include holes 258 in the housing members that align for the insertion of fastener 256, whereby tightening the adaptor 217 to the adjustable housing portion 250B.

The fastener 256 may allow for rotation of the adjustable housing portion 250B relative to the fixed housing portion 250A. In this way, the bearing assembly of FIGS. 2C-2E may allow for the adjustable housing portion 250B to adjust the position of the adapter (and rail) out of alignment with the central axis 2000 of the support beam and attached fixed housing portion 250A. The adjustable housing portion 250B may allow the adapter (and rail) to pitch or swing upward or downward through the fastener 256 and/or allow for rotation thereof. As shown best in FIG. 2E, the adjustable housing portion 250B may be capable of adjusting at least a portion of the adapter out of alignment with a central axis of the support beam at an angle, α, of at least −60° and not greater than +60°. This may account for gravitational force allowing the adapter to align across undulating terrain, as described above. In this way, the adjustable housing portion 250B may be capable of self-aligning adjustment of at least a portion of the adapter 217 and rail out of alignment with a central axis 2000 of the support beam and the fixed housing portion 250A.

Figure 3A:
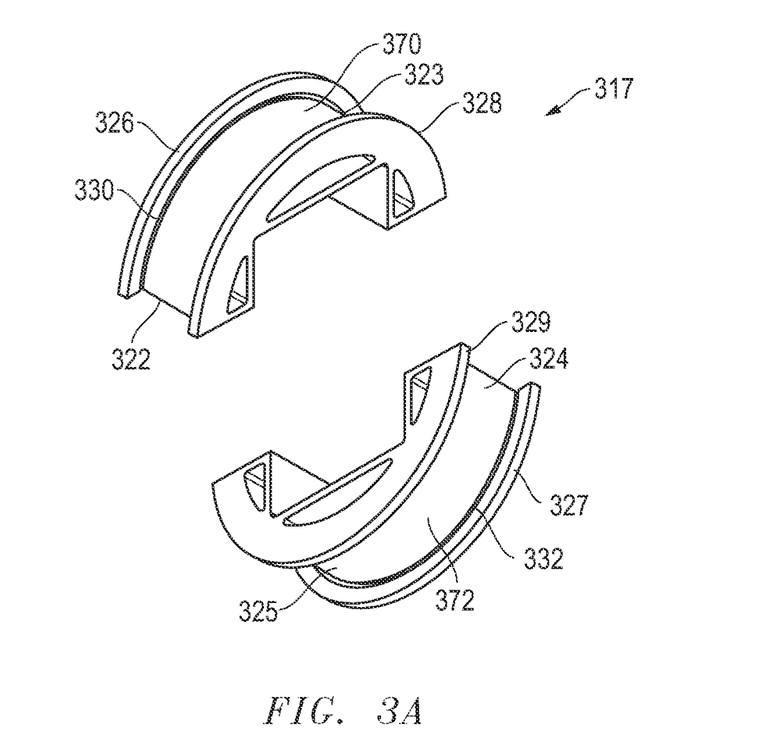
FIG. 3A includes an illustration of a side view of the adaptor for the tracking assembly according to an embodiment.
Figure 3B:
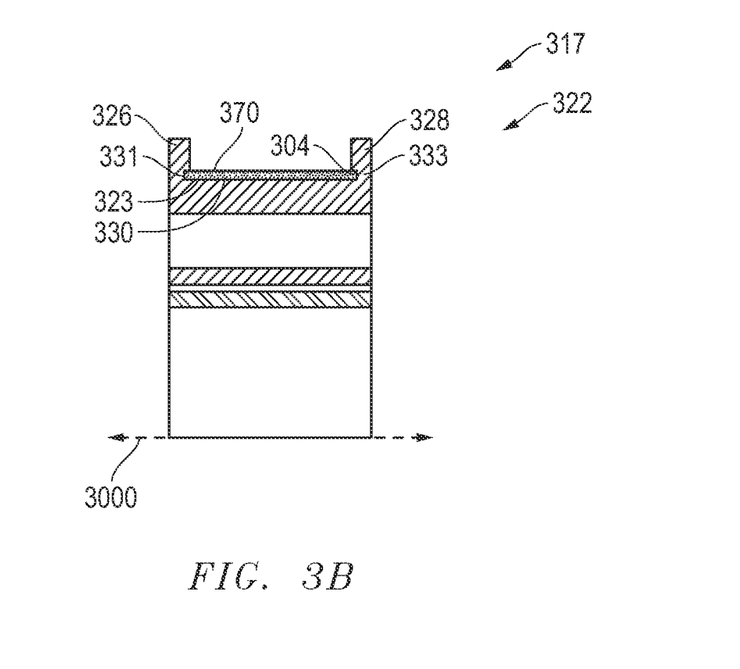
FIG. 3B includes an illustration of a cross-sectional view of a first adaptor member of an adaptor around a rail in the radial direction for a tracking assembly according to an embodiment.

FIGS. 3A-3B include views of the adaptor for the tracking assembly according to embodiments herein. FIG. 3A includes an illustration of a side view of the adaptor for the tracking assembly according to an embodiment. FIG. 3B includes an illustration of a cross-sectional view of a first adaptor member of an adaptor around a rail in the radial direction for a tracking assembly according to an embodiment. As stated above, the adaptor 317 may include a first adaptor member 322 and a second adaptor member 324 coupled thereto. The first adaptor member 322 and the second adaptor member 324 may each include an exterior surface (323, 325). The exterior surface 323, 325 of the first adaptor member 322 and the second adaptor member 324 may each include an arc shaped structure, so as to form a circular shaped structure for an exterior portion of the adaptor 317. Each of the first adaptor member 322 and the second adaptor member 324 may include a pair of side portions (326, 328, 327, 329) facing each other and extending axially from the exterior surface 323, 325 of each of the first adaptor member 322 and the second adaptor member 324. The pair of side portions (326, 328, 327, 329) may form a circumferential groove 330, 332 that is a part of the exterior surface 323, 325 of each of the first adaptor member 322 and the second adaptor member 324 of the adaptor 317. In a number of embodiments, a material strip 370, 372 may be mounted or disposed against the exterior surface 323, 325 of the first adaptor member 322 and/or second adaptor member 324. The material strip 370, 372 may be placed within the circumferential groove 330, 332 of the first adaptor member 322 and/or the second adaptor member 324. In an embodiment, a plurality of material strips 370, 372 may be placed within the circumferential groove 330, 332 of the first adaptor member 322 and the second adaptor member 324. As shown best in FIG. 3B, the adaptor 317 may have a first adaptor member 322 that may be placed radially outside of a rail 318 in the tracker assembly 304. The adaptor 317 and/or first adaptor member 322 may further include slits (331, 333) that cut into the thickness of the side portions (326, 238) of the first adaptor member 322. The second adaptor member 324 may also include corresponding slits. The slits may be used to accommodate the material strip to mechanically fix the material strip(s) to the adaptor 317. The material strip may be mounted by sliding through the slits to affix to the exterior surface 323, 325 of at least one of the first adaptor member 322 or the second adaptor member 324 of the adaptor 317 inside the circumferential groove 330, 332.

As shown in FIG. 2A, the interior surface 255 of the first housing member 252 and the interior surface 259 second housing member 254 may form an interface with or be closely adjacent to the exterior surface of the first adaptor member and/or second adaptor member. As shown in FIGS. 3A-3B a material strip 370, 372 may be placed between at least one of the interior surface of the first housing member or the interior surface second housing member and exterior surface 323, 325 of the first adaptor member 322 or second adaptor member 324. For example, as shown best in FIG. 3B, the strip 370 may be placed in the groove 330 of the first adaptor member 322 while the interior surface of the first housing member may be sized to overlie the strip 370 within the groove 330. The material strip 370, 372 may include a low friction material as discussed in further detail below. The low friction material of the material strip 370, 372 at the interface between an interior surface of the housing and the exterior surface 323, 325 of the adaptor 317 may permit movement or slip of the adaptor 317 (and fixed rail) relative to the housing or vice versa by providing a desired slip interface. In this way, the low friction material may be present at an interface between the interior surface 255 of the first housing member 252 or the interior surface 259 of the second housing member 254, and the exterior surface 323, 325 of the first adaptor member 322 and/or second adaptor member 324. In an embodiment shown in FIGS. 3A-3B, the material strip 370, 372 including the low friction material may be fixed to an exterior surface 323, 325 of at least one of the first adaptor member 322 or the second adaptor member 324 of the adaptor 317. For example, this may be done by fixing the material strip 370 within the groove 330 of the first adaptor member 322 with the slits (331, 333) in the first adaptor member 322 of the adaptor 317 as described above. In another embodiment, as discussed in further detail below, the material strip 370, 370 may be preformed according to the shape of the adaptor 317. For example, the material strip 370 may be sized to provide a zero-clearance fit within the groove 330 of the first adaptor member 322 against the side portions 326, 328 and molded or adhesively attached to the first adaptor member 322.

In an embodiment therein, the adaptor, rail, housing, or any components mentioned herein (or any components thereof) may at least partially include a metal. According to certain embodiments, the metal may include iron, copper, titanium, tin, aluminum, alloys thereof, or may be another type of metal. In a number of embodiments, the adaptor, rail, housing, or any components mentioned herein (or any components thereof) may include a polymer. In an embodiment, the adaptor, rail, and or housing (or any components thereof) may be made a plastic polymer. The plastic polymer may be selected from the group including a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polypropylene (PP), polycarbonate (PC), Acrylonitrile butadiene styrene (ABS), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. The plastic polymer may be a thermoplastic or thermosetting polymer. In an embodiment therein, the adaptor, rail, and or housing (or any components thereof) may also includes glass filler, silica, clay mica, kaolin or other synthetic fillers. In an embodiment therein, the adaptor, rail, and or housing (or any components thereof) may be constructed by at least one of a chamfering, turning, reaming, forging, extruding, molding, sintering, rolling, or casting, injection molding, or 3-D printing. The adaptor, rail, housing, or any components mentioned herein (or any components thereof) of embodiments herein can utilize one or more combinations of features, including particular materials, thicknesses of the material, dimensions of the component, and certain mechanical properties (e.g., stiffness), and chemical inertness that are desired in the industry.

As stated above, in a number of embodiments, a material strip may be mounted, affixed, or otherwise disposed against the exterior surface of the adaptor (first adaptor member and/or second adaptor member). Further, as stated above, in a number of embodiments, a material strip may be mounted, affixed, or otherwise disposed against the interior surface of the housing (first housing member and/or second housing member). For purposes of illustration, FIG. 4 includes a diagram showing a forming process 410 for forming the material strip. The forming process 410 may include a first step 412 of providing a material including a low friction material. Optionally, the forming process 410 may further include a second step 414 of placing a substrate against the low friction material to form a material strip.

Figure 4:
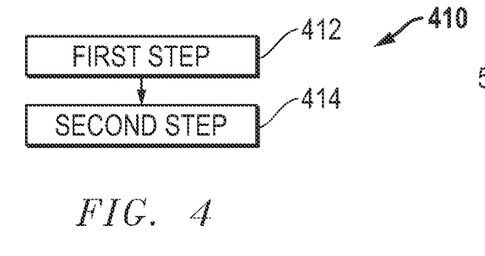
FIG. 4 includes a method of forming a bearing in accordance with an embodiment.
Figure 5A:
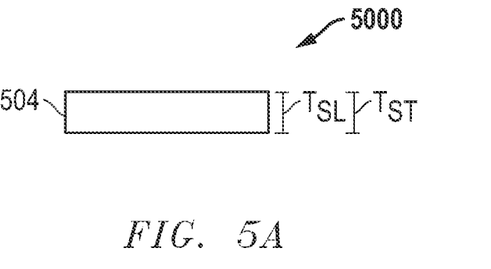
FIG. 5A includes a cross-sectional view of one embodiment of a bearing in accordance with an embodiment.

FIG. 5A includes an illustration of a material strip 5000 that may be formed using the first step 412 of the forming process 410 shown in FIG. 4. In a number of embodiments, the material strip 5000 may include a low friction layer 504. In a number of embodiments, the low friction layer 504 can include a low friction material. Low friction materials may include, for example, a polymer, such as a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In an example, the low friction layer 504 includes polyketone, such as polyether ether ketone (PEEK), polyether ketone, polyether ketone ketone, polyether ketone ether ketone, a derivative thereof, or a combination thereof. In an additional example, the low friction layer 504 may include an ultra high molecular weight polyethylene. In another example, the low friction layer 504 may include a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The low friction layer 504 may be a thermoplastic or thermosetting polymer. The low friction layer 504 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments. In an embodiment, the low friction layer 504 may include a woven mesh or an expanded metal grid where the low friction material is embedded within and impregnating the woven mesh or expanded metal grid. The woven mesh or expanded metal grid can include a metal or metal alloy such as aluminum, steel, stainless steel, bronze, or the like. Alternatively, the woven mesh can be a woven polymer mesh made of low friction material.

In a number of embodiments, the low friction layer 504 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 10 wt % based on the total weight of the low friction layer, such as at least 15 wt %, 20 wt %, 25 wt % or even 30 wt %.

Figure 5B:
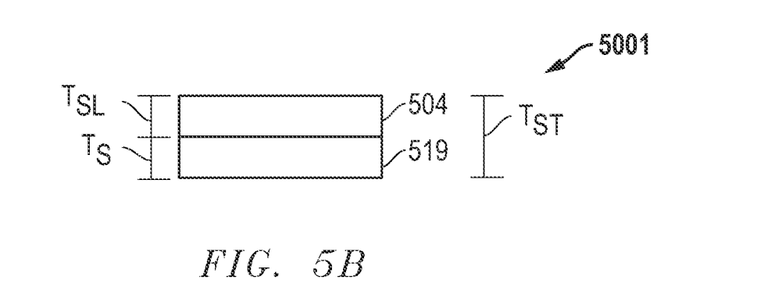
FIG. 5B includes a cross-sectional view of one embodiment of a bearing in accordance with an embodiment.

FIG. 5B includes an illustration of another embodiment of a material strip 5001, alternative to the material strip 5000, that may be formed using the first step 612 of the forming process 410 shown in FIG. 4. For purposes of illustration, FIG. 4B shows the layer by layer configuration of a material strip 5001. The material strip 5001 may include a substrate 519. In an embodiment, the substrate 519 can at least partially include a metal. According to certain embodiments, the metal may include iron, copper, titanium, tin, aluminum, alloys thereof, or may be another type of metal. More particularly, the substrate 519 can at least partially include a steel, such as, a stainless steel, carbon steel, or spring steel. For example, the substrate 519 can at least partially include a 301 stainless steel. The 301 stainless steel may be annealed, ¼ hard, ½ hard, ¾ hard, or full hard. Moreover, the steel can include stainless steel including chrome, nickel, or a combination thereof. In an embodiment, the substrate 519 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the substrate 519 may not include a mesh or grid. Further, the substrate 519 can include a Vickers pyramid number hardness, VPN, which can be ≥350, such as ≥375, ≥400, ≥425, or ≥450. VPN can also be ≥500, ≥475, or ≥450. VPN can also be within a range between, and including, any of the VPN values described herein. In another aspect, the substrate 519 can be treated to increase its corrosion resistance. In particular, the substrate 519 can be passivated. For example, the substrate 519 can be passivated according to the ASTM standard A967. The substrate 519 may be formed by at least one of chamfering, turning, reaming, forging, extruding, molding, sintering, rolling, or casting.

Still referring to FIG. 5B, in a number of embodiments, the material strip 5001 may include substrate 519 (and low friction layer 504 coupled to or overlying the substrate 519. In a more particular embodiment, the material strip 5001 may include a substrate 519 and a plurality of one low friction layers 504 overlying the substrate 519. In a particular embodiment, the low friction layer 504 can be coupled to a surface of the substrate 519 so as to form an interface with another surface of another component. The low friction layer 504 can be coupled to the radially inner surface of the substrate 519. Alternatively, the low friction layer 504 can be coupled to the radially outer surface of the substrate 519. In another alternate embodiment, the substrate 519, as a solid component, woven mesh or expanded metal grid, may be embedded or impregnated with the low friction layer 504. In an embodiment, the substrate 519 may be at least partially encapsulated by the low friction layer 504. That is, the low friction layer 504 may cover at least a portion of the substrate 519.

Figure 5C:
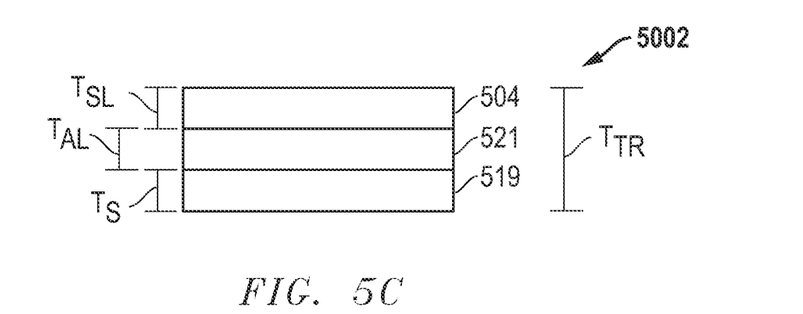
FIG. 5C includes a cross-sectional view of one embodiment of a bearing in accordance with an embodiment.

FIG. 5C includes an illustration of an alternative embodiment of the material strip 5002, alternative to the material strips 5000, 5001, that may be formed into the material strip of the first step 412 of the forming process 410 shown in FIG. 4. For purposes of illustration, FIG. 5C shows the layer by layer configuration of a material strip 5002 of the material strip. According to this particular embodiment, the material strip 5002 may be similar to the material strip 5001 of FIG. 5B, except this material strip 5002 may also include at least one adhesive layer 521 that may couple the low friction layer 504 to the substrate 519 and a low friction layer 504. In another alternate embodiment, the substrate 519, as a solid component, woven mesh or expanded metal grid, may be embedded between at least one adhesive layer 521 included between the low friction layer 504 and the substrate 519.

The adhesive layer 521 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof.

Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer.

Filler particles (functional and/or nonfunctional) may be added in to the adhesive layer 521 such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof.

In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C.

Figure 5D:
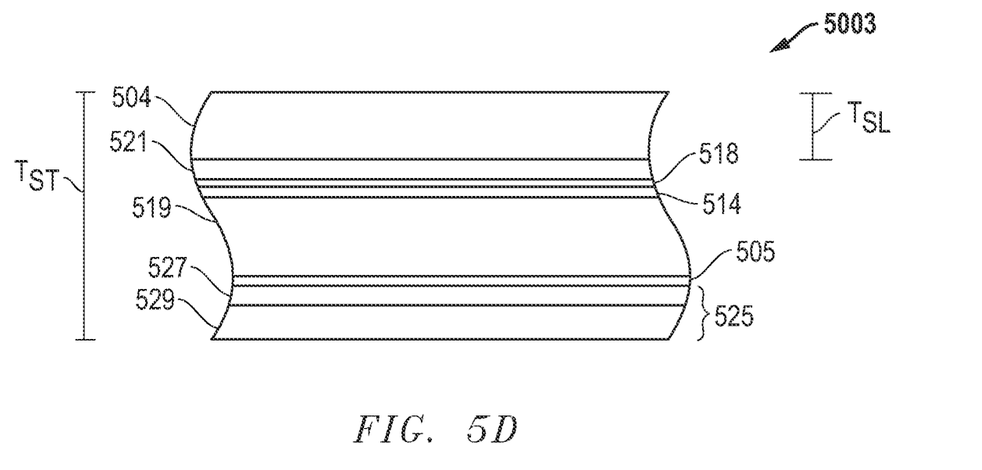
FIG. 5D includes a cross-sectional view of one embodiment of a bearing in accordance with an embodiment.

FIG. 5D includes an illustration of an alternative embodiment of the material strip 5003, alternative to the material strips 5000, 5001, 5002, which may be formed into the material strip of the first step 412 of the forming process 410 shown in FIG. 4. For purposes of illustration, FIG. 5D shows the layer by layer configuration of a material strip 5003. According to this particular embodiment, the material strip 5003 may be similar to the material strip 5002 of FIG. 5C, except this material strip 5003 may also include at least one corrosion protection layer 514, 505, and 518, and a corrosion resistant coating 525 that can include an adhesion promoter layer 527 and an epoxy layer 529 that may couple to the substrate 519 and a low friction layer 504.

The substrate 519 may be coated with corrosion protection layers 514 and 505 including corrosion protection material to prevent corrosion of the material strip 5003 prior to processing. Additionally, a corrosion protection layer 518 can be applied over layer 514. Layers 514 and 505 can include corrosion protection materials including a phosphate of zinc, iron, manganese, or any combination thereof, or a nano-ceramic layer. Further, layers 514 and 505 can include corrosion protection materials including functional silanes, nano-scaled silane based primers, hydrolyzed silanes, organosilane adhesion promoters, solvent/water based silane primers, chlorinated polyolefins, pas sivated surfaces, commercially available zinc (mechanical/galvanic) or zinc-nickel coatings, or any combination thereof. Layer 518 can include functional silanes, nano-scaled silane based primers, hydrolyzed silanes, organosilane adhesion promoters, solvent/water based silane primers. Corrosion protection layers 514, 505, and 518 can be removed or retained during processing.

As stated above, the material strip 5003 may further include a corrosion resistant coating 525. The corrosion resistant coating 525 can include an adhesion promoter layer 527 and an epoxy layer 529. The adhesion promoter layer 527 can include corrosion protection materials including phosphate of zinc, iron, manganese, tin, or any combination thereof, or a nano-ceramic layer. The adhesion promoter layer 527 can include corrosion protection materials including functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The adhesion promoter layer 527 can be applied by spray coating, e-coating, dip spin coating, electrostatic coating, flow coating, roll coating, knife coating, coil coating, or the like.

The epoxy layer 529 can be corrosion protection materials including a thermal cured epoxy, a UV cured epoxy, an IR cured epoxy, an electron beam cured epoxy, a radiation cured epoxy, or an air cured epoxy. Further, the epoxy layer 529 can include corrosion protection materials including polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 529 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners such as chromium, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above. In an embodiment, the epoxy layer 529 can include fillers to improve the conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the material strip as compared to a material strip without conductive fillers. In an embodiment, the epoxy layer 529 can be applied by spray coating, e-coating, dip spin coating, electrostatic coating, flow coating, roll coating, knife coating, coil coating, or the like. Additionally, the epoxy layer 529 can be cured, such as by thermal curing, UV curing, IR curing, electron beam curing, irradiation curing, or any combination thereof. Preferably, the curing can be accomplished without increasing the temperature of the component above the breakdown temperature of any of the low friction layer 504, the adhesive layer 521, the substrate 519, or the adhesion promoter layer 527. Accordingly, the epoxy may be cured below about 250° C., even below about 200° C.

In an embodiment, under step 412 of FIG. 4, any of the layers on the material strip 5000, 5001, 5002, 5003, as described above in reference to FIGS. 5A-5D, can each be disposed in a roll and peeled therefrom to join together under pressure, at elevated temperatures (hot or cold pressed or rolled), by an adhesive, or by any combination thereof. Any of the layers on the material strip 5000, 5001, 5002, 5003, as described above, may be laminated together such that they at least partially overlap one another. Any of the layers on the material strip 5000, 5001, 5002, 5003, as described above, may be applied together using coating technique, such as, for example, physical or vapor deposition, spraying, plating, powder coating, or through other chemical or electrochemical techniques. In a particular embodiment, the low friction layer 504 may be applied by a roll-to-roll coating process, including for example, extrusion coating. The low friction layer 504 may be heated to a molten or semi-molten state and extruded through a slot die onto a major surface of the substrate 519. In an embodiment, the material strip 5000, 5001, 5002, 5003, may be a single unitary strip of material.

In other embodiments, under step 412 of FIG. 4, any of the layers on the material strip 5000, 5001, 5002, 5003 as described above in reference to FIGS. 5A-5D, as described above, may be applied by a coating technique, such as, for example, physical or vapor deposition, spraying, plating, powder coating, or through other chemical or electrochemical techniques. In a particular embodiment, the low friction layer 504 may be applied by a roll-to-roll coating process, including for example, extrusion coating. The low friction layer 504 may be heated to a molten or semi-molten state and extruded through a slot die onto a major surface of the substrate 519. In another embodiment, the low friction layer 504 may be cast or molded.

In an embodiment, the low friction layer 504 or any layers can be glued to the substrate 519 using the melt adhesive layer 521 to form a laminate. In an embodiment, any of the intervening or outstanding layers on the material strip 5000, 5001, 5002, 5003, may form the laminate. The laminate can be cut into strips or blanks that can be formed into the material strip. The cutting of the laminate may include use of a stamp, press, punch, saw, or may be machined in a different way. The material strip may then be formed by stamp, press, punch, saw, rolling, flanging, deep-drawing, or may be machined in a different way to fit the shape of the adaptor or housing as described above. In particular embodiment, the material strip 5000 may be molded directly to one of the adaptor or the housing. In another embodiment, the material strip 5000 may be molded to the adaptor or housing as a layer on the component, resulting in a layered structure similar to FIG. 5B. In still another embodiment, the material strip 5000 may be adhesively affixed to the adaptor or housing as a layer on the component with an adhesive layer therebetween, resulting in a layered structure similar to FIG. 5C. In another embodiment, the material strip 5003 may be affixed in total to the adaptor or housing. After shaping the semi-finished material strip, the semi-finished material strip may be cleaned to remove any lubricants and oils used in the forming and shaping process. Cleaning may include chemical cleaning with solvents and/or mechanical cleaning, such as ultrasonic cleaning.

The bearing assemblies of the tracker assemblies of the embodiments herein can demonstrate improved operations and characteristics over conventional bearing assemblies of the tracker assemblies. For example, in one embodiment, the bearing assemblies of embodiments herein demonstrate improved resistance to corrosion and weathering. Further, bearing assemblies of embodiments herein demonstrate improved stick-slip performance properties due to the material strip, which are an improvement over conventional bearing members. Further, the housing may allow for swinging the adapter and rail, allowing for compensation of axial misalignments between multiple bearing assemblies and/or tracker assemblies that may compensate for ground/land undulations or misalignment. Therefore, bearing assemblies of the tracker assemblies of the embodiments herein may improve efficiency, provide lower maintenance, lower the cost of installation, and therefore, increase potential deployment of tracker assemblies and/or renewable energy structures.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A bearing assembly of a power generation structure comprising: an adapter fixed to and rotatable with a rail; and a housing adapted to support the adapter and the rail; wherein the housing comprises a fixed housing portion attached to a support beam, and an adjustable housing portion attached to the adapter and rail, wherein a low friction material is present at an interface between an exterior surface of adaptor and an interior surface of the adjustable housing portion, wherein the adjustable housing portion is capable of self-aligning adjustment of at least a portion of the adapter and rail out of alignment with a central axis of the support beam.

Embodiment 2: A bearing assembly of a power generation structure comprising: an adapter fixed to and rotatable with a rail; and a housing adapted to support the adapter and the rail; wherein the housing comprises a fixed housing portion attached to a support beam, and an adjustable housing portion attached to the adapter and rail, wherein a low friction material is present at an interface between an exterior surface of adaptor and an interior surface of the adjustable housing portion, wherein the adjustable housing portion is capable of self-aligning adjustment of at least a portion of the adapter and rail out of alignment with a central axis of the support beam.

Embodiment 3: A bearing assembly of a power generation structure comprising: an adapter; and a housing comprising a fixed housing portion attached to a support beam, and an adjustable housing portion attached to the adapter, wherein a low friction material is present at an interface between an exterior surface of adaptor and an interior surface of the adjustable housing portion, wherein the adjustable housing portion is capable of adjusting at least a portion of the adapter out of alignment with a central axis of the support beam at an angle, $\alpha$, of at least $-60°$ and not greater than $+60°$.

Embodiment 4: A tracker assembly of a power generation structure comprising: a support beam having a central axis; a rail adapted to rotate about a rotational axis; and a bearing assembly operatively attached to the support beam and the rail, the bearing assembly comprising: an adapter fixed to and rotatable with the rail; and a housing adapted to support the adapter and the rail; wherein the housing comprises a fixed housing portion attached to the support beam, and an adjustable housing portion attached to the adapter and rail, wherein a low friction material is present at an interface between an exterior surface of adaptor and an interior surface of the adjustable housing portion, wherein the adjustable housing portion is capable of self-aligning adjustment of at least a portion of the adapter and rail out of alignment with the central axis of the support beam.

Embodiment 5: The bearing assembly or tracker assembly according to any of the preceding embodiments, wherein the adaptor has an interior surface for engaging a rail, wherein the interior surface has a cross-sectional shape that is non-circular.

Embodiment 6: The bearing assembly or tracker assembly according to any of the preceding embodiments, wherein an exterior surface of the rail has a cross-sectional shape that is non-circular.

Embodiment 7: The bearing assembly or tracker assembly according to embodiment 6, wherein the non-circular cross section of the interior surface of the adaptor is complementary to the non-circular cross section of the exterior surface of the rail so as to fix the two components.

Embodiment 8: The bearing assembly or tracker assembly according to any of the preceding embodiments, wherein the adjustable housing portion comprises a first housing member and a second housing member adapted to function as a clamp around the adaptor.

Embodiment 9: The bearing assembly or tracker assembly according to any of the preceding embodiments, wherein the low friction material is fixed to an exterior surface of the adapter.

Embodiment 10: The bearing assembly or tracker assembly according to any of the preceding embodiments, wherein the low friction material is fixed to an interior surface of the adjustable housing portion.

Embodiment 11: The bearing assembly or tracker assembly according to any of the preceding embodiments, wherein the low friction material comprises a material strip and wherein an exterior surface of the adapter comprises a groove adapted to accommodate the material strip.

Embodiment 12: The bearing assembly or tracker assembly according to any of the preceding embodiments, wherein the low friction material is preformed according to the shape of the adapter.

Embodiment 13: The bearing assembly or tracker assembly according to any of the preceding embodiments, wherein the low friction material comprises a thermoplastic polymer.

Embodiment 14: The bearing assembly or tracker assembly according to any of the preceding embodiments, wherein the low friction material comprises a fluoropolymer.

Embodiment 15: The bearing assembly or tracker assembly according to any of the preceding embodiments, further comprising a fastener for rotationally fastening the fixed housing portion to the adjustable housing portion.

Embodiment 16: The bearing assembly or tracker assembly according to embodiment 15, wherein the fastener comprises at least one of screws, bolts, clamps, clasps, clips, latches, pins, rivets, ties, or nails.

Embodiment 17: The bearing assembly or tracker assembly according to any of the preceding embodiments, further comprising a beam fastener for fastening the fixed housing portion to the support beam.

Embodiment 18: The bearing assembly or tracker assembly according to embodiment 17, wherein the fastener comprises at least one of screws, bolts, clamps, clasps, clips, latches, pins, rivets, ties, or nails.

Embodiment 19: The bearing assembly or tracker assembly according to any of the preceding embodiments, wherein the fixed housing portion is uniform with the support beam.

Embodiment 20: The bearing assembly or tracker assembly according to any of the preceding embodiments, wherein the fixed housing portion comprises a framed hood.

Embodiment 21: The bearing assembly or tracker assembly according to any of the preceding embodiments, wherein the rail is adapted to rotatably support a photovoltaic panel.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of assembly and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing assembly of a power generation structure comprising:
    an adapter fixed to and rotatable with a rail; and
    a housing adapted to support the adapter and the rail; wherein the housing comprises a fixed housing portion attached to a support column, and an adjustable housing portion attached to the adapter and rail, wherein a low friction material is present at an interface between an exterior surface of adaptor and an interior surface of the adjustable housing portion, wherein the adjustable housing portion is capable of self-aligning adjustment of at least a portion of the adapter and rail out of alignment with a central axis of the support column, wherein the adjustable housing portion is capable of adjusting at least a portion of the adapter out of alignment with a central axis of the support column at an angle, $\alpha$, of at least $-60°$ and not greater than $+60°$.

2. The bearing assembly according to claim 1, wherein the adaptor has an interior surface for engaging a rail, wherein the interior surface has a cross-sectional shape that is non-circular.

3. The bearing assembly according to claim 1, wherein an exterior surface of the rail has a cross-sectional shape that is non-circular.

4. The bearing assembly according to claim 3, wherein the non-circular cross section of the interior surface of the adaptor is complementary to the non-circular cross section of the exterior surface of the rail so as to fix the two components.

5. The bearing assembly according to claim 1, wherein the adjustable housing portion comprises a first housing member and a second housing member adapted to function as a clamp around the adaptor.

6. The bearing assembly according to claim 1, wherein the low friction material is fixed to an exterior surface of the adapter.

7. The bearing assembly according to claim 1, wherein the low friction material is fixed to an interior surface of the adjustable housing portion.

8. The bearing assembly according to claim 1, wherein the low friction material comprises a material strip and wherein an exterior surface of the adapter comprises a groove adapted to accommodate the material strip.

9. The bearing assembly according to claim 1, wherein the low friction material is preformed according to the shape of the adapter.

10. The bearing assembly according to claim 1, wherein the low friction material comprises a thermoplastic polymer.

11. The bearing assembly according to claim 1, wherein the low friction material comprises a fluoropolymer.

12. The bearing assembly according to claim 1, further comprising a fastener for rotationally fastening the fixed housing portion to the adjustable housing portion.

13. The bearing assembly according to claim 12, wherein the fastener comprises at least one of screws, bolts, clamps, clasps, clips, latches, pins, rivets, ties, or nails.

14. The bearing assembly according to claim 1, further comprising a column fastener for fastening the fixed housing portion to the support column.

15. The bearing assembly according to claim 14, wherein the fastener comprises at least one of screws, bolts, clamps, clasps, clips, latches, pins, rivets, ties, or nails.

16. The bearing assembly according to claim 1, wherein the fixed housing portion is uniform with the support column.

17. The bearing assembly according to claim 1, wherein the fixed housing portion comprises a framed hood.

18. The bearing assembly according to claim 1, wherein the rail is adapted to rotatably support a photovoltaic panel.

19. A bearing assembly of a power generation structure comprising:
   a rail; and
   a housing adapted to support the rail; wherein the housing comprises a fixed housing portion attached to a support column, and an adjustable housing portion attached to rail, wherein a low friction material is present at an interface between an exterior surface of rail and an interior surface of the adjustable housing portion, wherein the adjustable housing portion is capable of self-aligning adjustment of at least a portion of the rail out of alignment with a central axis of the support column, wherein the adjustable housing portion is capable of adjusting at least a portion of the rail out of alignment with a central axis of the support column at an angle, $\alpha$, of at least $-60°$ and not greater than $+60°$.

20. A bearing assembly of a power generation structure comprising:
   an adapter; and
   a housing comprising a fixed housing portion attached to a support column, and an adjustable housing portion attached to the adapter, wherein a low friction material is present at an interface between an exterior surface of adaptor and an interior surface of the adjustable housing portion, wherein the adjustable housing portion is capable of adjusting at least a portion of the adapter out of alignment with a central axis of the support column at an angle, $\alpha$, of at least $-60°$ and not greater than $+60°$.

\* \* \* \* \*